United States Patent
Grimm

(10) Patent No.: US 9,358,712 B2
(45) Date of Patent: Jun. 7, 2016

(54) DEVICE AND METHOD FOR OPERATING A MACHINE EQUIPPED WITH A HANDLING DEVICE

(71) Applicant: KRAUSSMAFFEI TECHNOLOGIES GMBH, München (DE)

(72) Inventor: Günther Grimm, Hilgertshausen (DE)

(73) Assignee: KRAUSSMAFFEI TECHNOLOGIES GMBH, München (DE)

(*) Notice: Subject to any disclaimer, the term of this patent is extended or adjusted under 35 U.S.C. 154(b) by 0 days.

(21) Appl. No.: 14/385,924

(22) PCT Filed: Mar. 25, 2013

(86) PCT No.: PCT/EP2013/056212
§ 371 (c)(1),
(2) Date: Sep. 17, 2014

(87) PCT Pub. No.: WO2013/139990
PCT Pub. Date: Sep. 26, 2013

(65) Prior Publication Data
US 2015/0086667 A1   Mar. 26, 2015

(30) Foreign Application Priority Data
Mar. 23, 2012  (DE) .................. 10 2012 005 975

(51) Int. Cl.
*B29C 45/76* (2006.01)
*G05B 19/409* (2006.01)

(52) U.S. Cl.
CPC .............. *B29C 45/762* (2013.01); *B29C 45/76* (2013.01); *G05B 19/409* (2013.01); *B29C 2045/7606* (2013.01)

(58) Field of Classification Search
CPC ................. B29C 45/76; B29C 45/762; B29C 2045/7606; G05B 19/409
See application file for complete search history.

(56) References Cited

U.S. PATENT DOCUMENTS 4,639,881 A * 1/1987 Zingher .................. 715/839
5,234,328 A * 8/1993 Willson et al. ............ 425/139
(Continued)

FOREIGN PATENT DOCUMENTS

CH          703 723         3/2012
DE      19909307 A1 *   9/1999  ............. B29C 45/58
(Continued)

OTHER PUBLICATIONS

International Search Report issued by the European Patent Office in International Application PCT/EP2013/056212.

*Primary Examiner* — Yogendra Gupta
*Assistant Examiner* — Emmanuel S Luk
(74) *Attorney, Agent, or Firm* — Henry M. Feiereisen LLC

(57) ABSTRACT

A device for operating a machine equipped with a handling device, particularly an injection molding machine, includes a first stationary operating device secured to the machine, and a second mobile operating device. The operating devices can be designed to be touch screen. The stationary operating device is designed for operating both the machine and the handling device and the mobile operating device is likewise designed for operating both the handling device and the machine. Each operating device is fully equipped for comprehensive configuration or programming and for operating the machine and the handling device. The screen of the mobile operating device is smaller than the screen of the stationary operating device, and predefinable regions of a screen page of the screen of the stationary operating device can be shown successively on the screen of the mobile operating device.

20 Claims, 1 Drawing Sheet

(56) References Cited

U.S. PATENT DOCUMENTS

| | | | |
|---|---|---|---|
| 5,470,218 A * | 11/1995 | Hillman et al. | 425/144 |
| 5,795,511 A * | 8/1998 | Kalantzis et al. | 264/40.6 |
| 5,866,175 A * | 2/1999 | Latham | 425/170 |
| 6,122,565 A * | 9/2000 | Wenning et al. | 700/206 |
| 6,737,001 B1 * | 5/2004 | Norton | 264/40.1 |
| D491,175 S * | 6/2004 | Shimano | D14/318 |
| 6,781,819 B2 * | 8/2004 | Yang | G06F 1/162 341/22 |
| 7,787,983 B2 | 8/2010 | Grimm | |
| 8,316,297 B2 | 11/2012 | Grimm | |
| 8,417,371 B2 * | 4/2013 | Werfeli et al. | 700/197 |
| 2002/0031567 A1 * | 3/2002 | Magario | 425/135 |
| 2002/0035551 A1 * | 3/2002 | Sherwin et al. | 705/412 |
| 2003/0032438 A1 * | 2/2003 | Maurilio | 455/500 |
| 2003/0075838 A1 * | 4/2003 | Vardin et al. | 264/532 |
| 2003/0133261 A1 * | 7/2003 | Minaguchi | G06F 1/1616 361/679.27 |
| 2003/0210513 A1 * | 11/2003 | Yen | G06F 1/1618 361/679.06 |
| 2004/0081717 A1 * | 4/2004 | Marazita | 425/150 |
| 2004/0224045 A1 | 11/2004 | Grimm | |
| 2005/0019443 A1 * | 1/2005 | Boyd et al. | 425/556 |
| 2005/0231509 A1 | 10/2005 | Grimm | |
| 2007/0134365 A1 | 6/2007 | Grimm | |
| 2007/0138680 A1 | 6/2007 | Grimm | |
| 2007/0182044 A1 | 8/2007 | Grimm | |
| 2007/0186144 A1 | 8/2007 | Stange | |
| 2007/0216055 A1 * | 9/2007 | Pilavdzic | 264/40.6 |
| 2008/0065243 A1 | 3/2008 | Fallman | |
| 2010/0065979 A1 | 3/2010 | Betsche | |
| 2010/0138031 A1 * | 6/2010 | Werfeli et al. | 700/200 |
| 2010/0274379 A1 * | 10/2010 | Hehl | 700/104 |
| 2011/0106284 A1 * | 5/2011 | Catoen et al. | 700/97 |
| 2012/0053718 A1 | 3/2012 | Grimm | |
| 2013/0227427 A1 | 8/2013 | Möckli | |
| 2014/0037779 A1 * | 2/2014 | Olaru | 425/135 |

FOREIGN PATENT DOCUMENTS

| | | | |
|---|---|---|---|
| DE | 10 2004 051 106 | 4/2006 | |
| DE | 10 2005 020 775 | 11/2006 | |
| DE | 10 2007 013 735 | 9/2007 | |
| DE | 10 2007 050 073 | 4/2009 | |
| EP | 1128244 A2 * | 8/2001 | G05B 19/418 |
| JP | 05-092458 * | 4/1993 | B29C 45/76 |

\* cited by examiner

DEVICE AND METHOD FOR OPERATING A MACHINE EQUIPPED WITH A HANDLING DEVICE

CROSS-REFERENCES TO RELATED APPLICATIONS

This application is the U.S. National Stage of International Application No. PCT/EP2013/056212, filed Mar. 25, 2013, which designated the United States and has been published as International Publication No. WO 2013/139990 and which claims the priority of German Patent Application, Ser. No. 10 2012 005 975.2, filed Mar. 23, 2012, pursuant to 35 U.S.C. 119(a)-(d).

BACKGROUND OF THE INVENTION

The invention relates to a device and a method for operating a machine equipped with a handling device, in particular an injection moulding machine.

Injection moulding machines with a linear robot as handling device are known, in which on the one hand a stationary operating device for the injection moulding machine and a mobile operating device for the linear robot are provided. The configuration and operation of the injection moulding machine and the configuration and operation of the linear robot run via a control arrangement. The configuration and the operation of the linear robot takes place on the screen of the stationary operating device of the injection moulding machine and on the screen of the mobile operating device of the linear robot with identical presentation of the screen pages and with identical functionality.

From DE 10 2005 020 775 A1 (see FIG. 1 therein), a handling device is known, designated therein as a robot, which has a stationary operating device in the form of a central monitoring and control device, which has input and output means. Input means can be keys, switches and levers. A screen is provided as output means. The central monitoring and control device is connected via a connecting cable with a mobile operating device, which is also designated as a manual operating device. The mobile operating device or respectively the manual operating device has an input field with input keys. Furthermore, it has a small display, in which words or single characters can be displayed. In order to also be able to carry out more extensive communication functions with such a manual operating device, if required, it is proposed in DE 10 2005 020 775 A1 to construct the manual operating device or respectively the mobile operating device in such a manner that it has a basic operating device and an optional extension module. The basic operating device comprises input and output means, which ensure at least the basic input and output functionality. The extension module is able to be arranged at least partially over the basic device and at least partially covers the latter. The input and output means of the basic device are replaced and/or supplemented by the input and output means of the extension module. More complex input and output functionalities are also able to be presented with the extension module. The input and output possibilities of the extension module therefore exceed as a whole the possibilities of the basic operating device.

From DE 10 2007 050 073 B4 a control device of a plastic-processing machine is known, wherein an operating device is provided with a touch-sensitive screen (touchscreen). The screen is divided, in terms of software, into a first, upper screen region and a second, lower screen region. In the upper screen region the injection moulding machine or parts thereof can be presented. However, operating data such as, for example, temperature values, pressure values etc., can also be presented. Furthermore, soft keys are present there, which can be actuated by means of the arrangement of a touch-sensitive touch surface. Machine input keys or respectively machine operating keys are realized in the second, lower screen region in terms of software or respectively by graphic presentation. The manner of presentation of the machine input keys or respectively of the machine operating keys depends inter alia on the functions which are available on the machine and the mode of operation. Depending on the mode of operation or current operating status, particular operating keys are switched so as to be inactive.

From DE 10 2007 013 735 A1 an injection moulding machine is known, in which an electronic control and several screens in communication with this control are provided with films in OLED technology (OLED: organic light emitting diode), which are detachably secured to the injection moulding machine. The OLED technology makes it possible to construct the screen in its dimensions such that it fits, for example, into the coat pocket of a user. Thereby, an operation of the control can take place so that the user is not committed to a particular location on the injection moulding machine. These OLED screens can therefore also be designated as a mobile operating device. A cable plug connection or a wireless radio connection can be present between these mobile operating devices and the central control of the injection moulding machine. In addition to the control of the injection moulding machine, provision is also made to also operate any handling devices which may be present likewise via the central control of the injection moulding machine and its OLED screens.

From DE 102004051106A1 an injection moulding machine is known, which has at least one operating unit, at least one machine control and at least one subsystem with its own control device. The machine control and the control device of the subsystem generate respectively a screen output and are able to be operated via this. At least one of the operating units is connected or able to be connected both with the machine control and also with the at least one control device of the subsystem for data transmission. The subsystems can be one or more robots. A PC or a laptop can be provided as mobile operating device. According to this prior art, provision is made that the screen outputs of the machine control and of the control devices of the subsystems are able to be shown and operated in different regions of the screen of the at least one operating unit. In order to enable a simultaneous presentation of the several screen outputs on one and the same screen of an operating unit, the screen output of the machine control and of the control devices of the subsystems must be shown in a correspondingly scaled manner. As a result, this leads to an overall presentation which is reduced in size and is therefore poorly discernible.

SUMMARY OF THE INVENTION

Proceeding from the above-mentioned prior art, the problem of the invention lies in indicating a device and a method for operating a machine equipped with a handling device, in particular an injection moulding machine, by which the configuration and running or respectively operating both of the machine and also of the handling device can be carried out more quickly and simply.

According to one aspect of the invention, a device for operating a machine equipped with a handling device, particularly an injection moulding machine, includes a first stationary operating device secured to the machine, and a second mobile operating device, wherein each operating device has input and output means, wherein the stationary operating device is designed both for operating the machine and also for operating the handling device, wherein the mobile operating device is designed both for operating the handling device and also for operating the machine, wherein at least the output means of the stationary and of the mobile operating device are constructed respectively as a screen, wherein the screen of the mobile device is smaller than the screen of the stationary operating device, and wherein predefinable regions of a screen page of the screen of the stationary operating device are able to be shown successively on the screen of the mobile operating device.

According to another aspect of the invention, a method for operating a machine equipped with a handling device, in particular an injection moulding machine, includes a first stationary operating device secured to the machine, and a second mobile operating device, wherein each operating device has input- and output means, wherein the stationary operating device is designed both for operating the machine and also for operating the handling device, wherein the mobile operating device is designed both for operating the handling device and for operating the machine, and wherein at least the output means of the stationary and of the mobile operating device are constructed respectively as a screen, wherein the screen of the mobile operating device is smaller than the screen of the stationary operating device, and wherein predefinable regions of a screen page of the screen of the stationary operating device are shown successively on the screen of the mobile operating device.

Advantageous further developments and embodiments are to be found in the dependent claims.

Through the fact that a first stationary operating device, secured to the machine, and a second mobile operating device are provided, wherein each operating device has input and output means, wherein the stationary operating device is designed both for operating the machine and also for operating the handling device and wherein the mobile operating device is designed both for operating the handling device and also for operating the machine, a complete or respectively fully equipped operating device is respectively available both for the machine and also for the handling device. Whilst the one fully equipped operating device is secured "conventionally" as a stationary operating device as usual on the machine, in particular on the injection moulding machine, a further mobile operating device is available, which is fully equipped for the configuration and operation of the handling device and machine. With the mobile operating device, an operator can move freely around the machine and for example with a view onto the handling device can configure and operate it. Through the full equipping of the mobile operating device, adjustments and operations can also be carried out on the machine itself by this operating device. For example, adjustments concerning the clamping unit of an injection moulding unit can be undertaken and checked by this mobile operating device. By simple "switching over" of the operating device to the adjustment pages for the handling device, for example an adapting of the movements of the handling apparatus to the movements of the movable parts of the clamping unit can be carried out in a simple and quick manner.

At least the output means of the stationary and of the mobile operating device can be constructed respectively as a screen, wherein the screen of the mobile operating device is smaller than the screen of the stationary operating device. Predefinable regions of the screen page of the screen of the stationary operating device can be shown successively on the screen of the mobile operating device. Despite the different size, a full integration is therefore to be present, i.e. all the screen pages which are also able to be shown on the stationary operating device are also to be able to be shown on the smaller screen of the mobile operating device.

The mobile operating device is complete or respectively fully equipped in the sense that on the one hand it corresponds to a fully equipped operating device for the handling device, but on the other hand can also undertake or show all the functions of a fully equipped operating device of the machine. Vice versa, the stationary operating device is complete or respectively fully equipped in the sense that on the one hand it corresponds to a fully equipped operating device for the machine, but on the other hand can also undertake or show all the functions of a fully equipped operating device of the handling device.

Advantageously, all the operating keys which are necessary for the operating both of the machine and also of the handling device are present, or can be produced or respectively presented, both on the stationary operating device and also on the mobile operating device. For this, the input and output means can be designed on the stationary operating device and on the mobile operating device respectively as a touch-sensitive screen (touchscreen).

It is regarded as advantageous in the sense of a full equipping of the two operating devices or respectively a full integration, if both on the stationary and also on the mobile operating device all the screen pages concerning the operation or respectively the control of the machine and all screen pages concerning the operation or respectively the control of the handling device are able to be shown.

In order to simplify the operation of the two operating devices and to avoid operating errors, provision can be made that the form of the operating keys for the machine is the same on the stationary and on the mobile operating device. The presentation of the machine operating keyboard is therefore advantageously identical on the two operating devices. This increases the safety during configuring and operating the machine, because the risk of operating errors is reduced. Identical functions of the machine are represented or able to be represented by identical operating keys on the stationary and mobile operating device. For example, machine operating keys for the functions "injection unit forward" or respectively "injection unit reverse" are indicated in an identical manner on the two operating devices, when the screen page appertaining respectively hereto has been selected on the respective operating device.

The above applies correspondingly also for the form of the operating keys for the handling device on the stationary and on the mobile operating device. The operating keys for the handling device, for example the start-up and shut-down of a gripper, are indicated in an identical manner on the two operating devices, when the screen page appertaining hereto has been selected on the respective operating device.

To improve the ease of use, provision can be made that the stationary operating device and/or the mobile operating device have switchover elements, by the actuation of which the presentation on the screen can be changed, wherein a changeover can be carried out between a presentation of the display—and operating field of the machine and a presentation of the display—and operating field of the handling device.

In a particularly advantageous embodiment, provision can be made that the stationary operating device and the mobile operating device are constructed respectively as a touch-sensitive screen (touchscreen), wherein the screen of the mobile operating device is smaller than the screen of the stationary operating device. This facilitates the handling of the mobile operating device. On the other hand, however, the mobile operating device is to have the same full equipping as the larger stationary operating device. Therefore, despite the different size, a full integration is to be present, i.e. all screen pages which are also able to be shown on the stationary operating device are also to be able to be shown on the smaller screen of the mobile operating device. For this purpose, provision is made that predefinable regions of a screen page of the screen of the stationary operating device are able to be shown successively on the screen of the mobile operating device. For example, provision can be made that the screen is divided on the stationary operating device in terms of software, in particular into an upper and a lower part. The two parts of the screen of the stationary operating device are then able to be shown individually respectively separately on the screen of the mobile operating device. Whether all elements of the presentation of the larger touchscreen are taken over identically or whether there are slight adaptations depends on the respective circumstances. A changeover can then be made back and forth between the presentation of the one part of the screen of the stationary operating device and the presentation of the other part of the screen. If necessary, also only particular regions of a screen page of the stationary operating device can be shown on the mobile operating device. If such a region is smaller than the screen area available on the touchscreen of the mobile operating device, other adjusting or operating elements can be displayed in the region which is still free, according to requirements. In any case, in this way all screen pages of the stationary operating device can be shown on the smaller mobile operating device or respectively on the smaller touchscreen of the mobile operating device.

In order to also enable extensive or respectively more complex configurations or a complete configuration or respectively programming of the machine via the mobile operating device, provision can be made that operating keys of the machine and input fields for the inputting of parameters for operating the machine are present or are able to be shown on the mobile operating device. The above also applies correspondingly for the handling device. Consequently, operating keys of the handling device and input fields for the inputting of parameters for the operation of the handling device should be present or able to be shown on the stationary operating device, so that also extensive or respectively more complex configurations or a complete configuration of the handling device becomes possible.

In the sense of the present invention, the configuration is also to include the programming of a cycle of the machine. In particular, the configuration is also to include the programming of a cycle of an injection moulding cycle. This programming can take place by means of graphic symbols for particular functions. These symbols can also be designated as icons. Advantageously, the same icons are provided for the programming of an injection moulding cycle on the mobile operating device as on the stationary operating device. As a whole, the operating philosophy or respectively the programming philosophy of the stationary and mobile operating device is to be the same.

As a whole, provision is therefore made according to the invention that the injection moulding machine can also be completely configured or respectively programmed and operated from the mobile operating device.

The presentation of the screen pages on the stationary operating device and the presentation of the screen pages on the mobile operating device are preferably independent of one another. On the other hand, provision is preferably made that the display of data or of graphic information always takes place, however, from the control component which has received the data or signals. If, therefore, data or signals are concerned, which relate to the handling device, then these data or signals are conveyed from the control component of the handling device to the two operating devices. If data or signals are concerned, which relate to the actual injection moulding machine, then these data or signals are conveyed from the control component of the injection moulding machine to the two operating devices. The production of the layout of the screen pages on the one hand and the displaying of contents in these layouts (data, graphic information of linear robot and injection moulding machine) therefore takes place independently or separately from one another. The two above-mentioned control components can be regarded in a combined manner as a central control or central control device of an entire installation. Each of these control components can have one or more CPUs. In addition to an injection moulding machine and a handling device, the entire installation can also have further components, for example a hot runner system or a temperature control unit. Further control units can be associated with the further components within the central control. The further control components can, however, also be integrated into the data network of the entire installation detached from the central control device.

BRIEF DESCRIPTION OF THE DRAWING

The invention is to be explained in further detail below with the aid of an example embodiment and with reference to FIGS. 1 to 3 which show in.

DETAILED DESCRIPTION OF PREFERRED EMBODIMENTS

Figure 1:
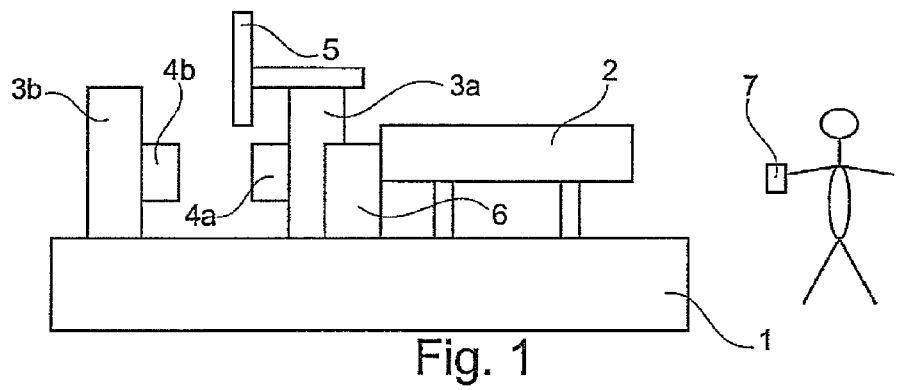
FIG. 1 a schematic illustration of an injection moulding machine embodying the subject matter of the present invention.

FIG. 1 shows diagrammatically an injection moulding machine with a machine bed 1, on which an injection unit 2 and a clamping unit 3 are arranged. The clamping unit 3 comprises a stationary platen 3a and a movable platen 3b which is able to be moved with respect thereto. The two platens carry mould halves 4a and 4b, which in the closed state form cavities. By means of the injection unit 2, a plastic melt can be produced and injected into the cavities, where the plastic melt can harden to form plastic moulded parts. After opening of the mould halves 4a and 4b, these moulded parts can be removed by means of a linear robot 5, known per se. Instead of the linear robot 5, other types of handling devices can also be provided. For example, a six-axis industrial robot could be installed on the floor adjacent to the injection moulding machine. In the region between the stationary platen 3a and the front end of the injection unit 2, a stationary operating device 6 is provided for configuration and operation of the injection moulding machine. This operating device 6 is fully equipped for configuring or respectively programming the injection moulding machine on the one hand and for configuring or respectively programming the linear robot 5 on the other hand. Of course, all other adjustment operations necessary for the operation of the injection moulding machine and of the linear robot can be carried out via this operating device 6. Preferably, the operating device has a touch-sensitive screen, also designated as a touchscreen. In a particularly preferred embodiment, the entire surface of the operating device 6 is embodied as a touchscreen and all input—and operating fields are shown in terms of software on the operating device 6, as is known from DE102007050073B4 of the applicant, mentioned in the introduction. Alternatively or additionally, however, further switches and keys and a screen for the input and output of data can also be provided. The operating unit 6 is connected via a bidirectional data connection 32 with the control component 30b of the injection moulding machine (see FIG. 2). The bidirectional data connection can be constructed as a data line 32, i.e. the data connection takes place by means of cables. The data transmission can, however, also take place wirelessly or respectively by radio, i.e. the bidirectional data connection 32 is constructed as a radio connection.

In FIG. 1, furthermore, on the right, adjacent to the injection moulding machine, an operator is illustrated, who is holding a mobile operating device 7 in one hand. The external dimensions of the mobile operating device 7 are considerably smaller than the external dimensions of the stationary operating device 6. Preferably, the mobile operating device 7 also has a touch-sensitive screen (touchscreen). In a particularly preferred embodiment, the entire surface of the operating device 7 is embodied as a touchscreen and all the input—and operating fields are shown in terms of software on the operating device 6, as is known from DE102007050073B4 of the applicant, mentioned in the introduction. However, alternatively or additionally, further switches and keys and a screen can also be provided for the input and output of data.

According to the invention, provision is now made that not only is the stationary operating device 6 designed both for operating the injection moulding machine and also for operating the handling device or respectively linear robot 5, but that also the mobile operating device 7 is designed both for operating the linear robot 5 and also for operating the injection moulding machine. Both on the stationary operating device 6 and also on the mobile operating device 7, all operating keys are present, or can be produced there, which are necessary for the operating both of the injection moulding machine and also of the linear robot 5. Both on the stationary and also on the mobile operating device, all screen pages concerning the operation or respectively control of the injection moulding machine, including the configuration or respectively programming of the injection moulding machine, and all screen pages concerning the operation or respectively the control of the linear robot 5, including the configuration or respectively programming of the linear robot, are able to be shown.

Figure 2:
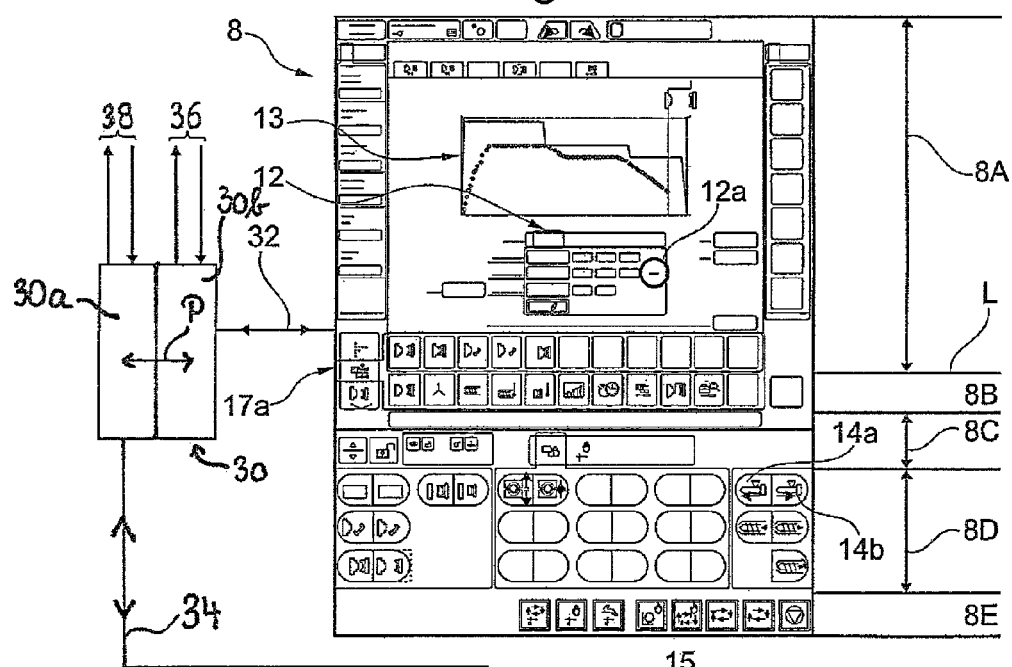
FIG. 2 a schematic illustration of a touchscreen of a stationary operating device.
Figure 3:
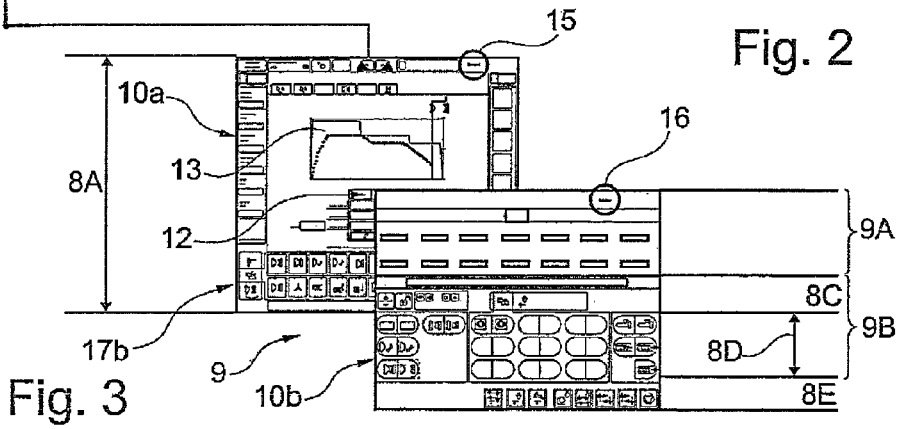
FIG. 3 a schematic illustration of a touchscreen of a mobile operating device.

The central idea of the present invention is to be explained in further detail with the aid of FIGS. 2 and 3.

FIG. 2 shows the touch-sensitive screen or respectively touchscreen 8 of the stationary operating device 6. The touchscreen 8 can be divided conceptually into several regions 8A-8E, the meaning of which is to be explained further below. According to the design of the operating device, the touchscreen 8 can form almost the entire surface of the operating device 6. FIG. 3 shows the touch-sensitive screen or respectively touchscreen 9 of the mobile operating device 7. According to the design of the operating device 7, the touchscreen 9 can also form almost the entire surface of the operating device 7. The touchscreen 9 is illustrated in FIG. 3 in two different operating states or respectively settings. The touchscreen 9 displays, in one setting, the screen page 10a, and in another setting, the screen page 10b. In the presentation of the screen page 10b, the touchscreen 9 can be divided conceptually into several regions 9A and 9B, the meaning of which is to be explained further below.

The central control 30 of the entire system, i.e. in the present example, the central control 30 of the injection moulding machine equipped with a handling device (e.g. a linear robot), comprises two control components with in each case their own CPU unit, namely a first control component 30a, which forms the control device for the linear robot 5, and a second control component 30b, which forms the control device for the actual injection moulding machine. Each CPU unit can have one or more CPUs. The first control component 30a for the control of the linear robot 5 is connected via data lines 38 with the actuators and sensors of the linear robot 5. The second control component 30b for the control of the actual injection moulding machine is connected via data lines 36 with the actuators and sensors of the injection moulding machine. A data exchange (indicated by double arrow P) can take place between the two control components 30a and 30b. This means that data can be exchanged between the CPU unit of the control device for the linear robot and the CPU unit of the control device for the actual injection moulding machine. The control component 30b for the actual injection moulding machine is connected via a first bidirectional data line 32 with the stationary operating device 6 or respectively with the stationary touchscreen 8. Video signals are transferred from the control component 30b to the screen 8 via this bidirectional data line 32. The screen pages on the screen 8 are produced via this data line 32 and filled with content. This means that both the layout of the screen pages is produced, and also display fields are filled with data or graphic representations with information, for example with a temperature reading (e.g. 200° C.) or a curve progression for a particular parameter. Solely the control component 30b is responsible for the production of the layout. According to the operating mode, the data which are to be displayed come from the control component 30a or from the control component 30b, as is explained further below. Inputs carried out on the touchscreen 8 or inputs carried out via a keyboard on the operating device 6 are conveyed to the central control 30 via the same data line 32. According to the operating mode, these inputs are transferred to the control component 30a or to the control component 30b. If interfaces for data transmission are provided on the operating device 6, for example a USB interface, data can also be conveyed from this interface to the central control 30.

In an analogous manner, the control component 30a for the linear robot 5 is connected with the mobile operating device 7 via a second bidirectional data line 34. Video signals are transferred from the control component 30a to the screen 9 via this bidirectional data line 34. The screen pages on the screen 9 are produced via this data line. 34 and filled with content. This means that both the layout of the screen pages is produced, and also display fields are filled with data or graphic presentations are filled with information, for example with an indication of position for an element of the linear robot 5 (e.g. 50 cm). Solely the control component 30a of the handling device or respectively the CPU unit appertaining hereto is responsible for the production of the layout of the screen pages. The data or graphic information which are to be displayed come, according to the operating mode, from the control part 30a or from the control part 30b, as is additionally explained further below. Via the same data line 34, inputs carried out on the touchscreen 9 or inputs carried out via a keyboard on the mobile operating device 7 are conveyed to the central control 30. If interfaces for data transmission are provided on the mobile operating device 7, for example a USB interface, data can also be conveyed from this interface to the central control 30.

As a result, therefore, an entirely specific operating device is associated with each control component with regard to the presentation of the screen pages. The layout of the screen pages of a particular operating device is therefore produced exclusively from the control component associated with this operating device. The presentation of the screen pages on the stationary operating device and the presentation of the screen pages on the mobile operating device are therefore independent of one another. The display of data or of graphic information takes place, however, always from the control component which has received the data or signals. If data or signals are concerned which relate to the linear robot 5, these data or signals are conveyed from the component 30*a* to the two operating devices. If data or signals are concerned which relate to the actual injection moulding machine, these data or signals are conveyed from the control component 30*b* to the two operating devices. The production of the layout of the screen pages on the one hand and the displaying of contents in these layouts (data, graphic information of linear robot and injection moulding machine) therefore takes place independently or separately from one another.

The stationary operating device 6 is therefore designed both for operating the injection moulding machine and also for operating the handling device, i.e. the linear robot 5. Vice versa, the mobile operating device 7 is also designed both for operating the handling device and also for operating the machine. This is to be explained in following examples. It is to be assumed that the linear robot 5 can be operated from both operating devices 6 and 7. For this, in the operating devices 6 and 7 respectively the "handling device" operating mode is to be selected. The layout of the screen pages on the stationary operating device 6 is produced solely from the control component 30*b* of the actual injection moulding machine. However, screen pages for the adjustment and/or operation of the linear robot 5 are produced and displayed. The data themselves which are to be displayed come from the control component 30*a* of the linear robot. These data are produced from the control component 30*a* and are transferred via the control component 30*b* to the stationary operating device 6 and are displayed there. The layout of the screen pages on the mobile operating device 7 is produced solely from the control component 30*a* of the linear robot, wherein screen pages for the adjustment and/or operation of the linear robot are produced and displayed. The data which are to be displayed are produced from the control component 30*a* and transferred from there directly to the mobile operating device 7 and are displayed there. Inputs at the stationary operating device 6 are transferred "through", via the data line 32 and the control component 30*b*, to the control component 30*a* for the linear robot. Inputs at the mobile operating device 7 are transferred via the data line 34 directly to the control component 30*a* for the linear robot. In a subsequent step, the concern is to be that settings are to be carried out on the actual injection moulding machine, wherein the injection moulding machine is to be operated from both operating devices 6 and 7. For this, the "injection moulding machine" operating mode is to be selected respectively in the operating devices 6 and 7. The layout of the screen pages on the stationary operating device 6 is still produced solely from the control component 30*b* of the actual injection moulding machine. In contrast to previously, screen pages are now displayed for the adjustment and/or operation of the injection moulding machine. The data to be displayed on the operating device 6, in contrast to previously, come from the control component 30*b* of the actual injection moulding machine. The layout of the screen pages on the mobile operating device 7 is produced solely from the control component 30*a* of the linear robot, wherein, however, screen pages are displayed for the adjustment and/or operation of the injection moulding machine. The data which are to be displayed themselves are produced from the control component 30*b* of the injection moulding machine, transferred to the control component 30*a* of the linear robot and from there via the data line 34 to the screen 9 of the mobile operating device 7. Inputs at the stationary operating device 6 are transferred via the data line 32 to the control component 30*b* for the injection moulding machine. Inputs at the mobile operating device 7 are transferred via the data line 34 to the control component 30*a* for the linear robot and from there on to the control component 30*b* for the injection moulding machine.

As can be readily seen from FIGS. 1-3, the external dimensions of the mobile operating device 7 and of its touchscreen 9 are distinctly smaller than the external dimensions of the stationary operating device 6 and of its touchscreen 8. The distinctly smaller size of the mobile operating device facilitates its handling by an operator. It is advantageous for practice if a comparatively small and manageable operating device is available for an operator, which the operator can carry around with him/her. Typically, the mobile operating device 7 is only approximately half as large as the stationary operating device 6 or even smaller. Accordingly, the touchscreen 9 is typically only approximately half as large as the touchscreen 8 or even smaller. In the embodiment which is shown here, the size of the touchscreen 9 in FIG. 3 corresponds substantially to the region 8A of the touchscreen 8 of FIG. 2, situated above the line L. Basically, the smaller touchscreen 9 can also form a smaller or larger region of the touchscreen 8.

The screen page 10*a* corresponds in its presentation and with respect to the available functionalities to the region 8A of the touchscreen 8 situated above the line L. Therefore, the same inputs can be carried out on the touchscreen 10*a* as on the region 8A of the touchscreen 8. For example, a window 12 with input elements or input fields 12*a* can be presented in terms of software identically on the touchscreen 8 and on the touchscreen 10*a*. The form of the input fields 12*a* is therefore the same on both screens 8 and 10*a*. For example, these could be input fields for the input of temperature- or pressure values. The result of the input is independent of whether the input is made on the touch screen 8 or on the touchscreen 10*a*. In both cases, the input is transferred to the control 30 of the injection moulding machine and brings about the desired adjustment on the injection moulding machine. If, on the basis of this input, a change is produced with regard to the course of a particular parameter shown in the graph 13, this change is displayed identically on the touchscreen 8 and on the touchscreen 9—in its operating position according to 10*a*.

The screen page 10*b* corresponds in a region 9B, in its presentation and with respect to the available functionalities, to the regions 8C, 8D and 8E of the screen page of FIG. 2. These regions 8C, 8D and 8E do not, however, fill the entire surface of the touchscreen 9, so that a region 9A remains, which is available for further displays and/or inputs. The regions 8C, 8D and BE are presented identically on the touchscreen 8 and on the touchscreen 10*a*. Therefore, all machine operating keys from the region 8D are also displayed identically on the touchscreen 8 and on the touchscreen 9—in its operating position according to 10*b*. The form of the machine operating keys and the form of the other keys and/or displays is therefore the same on both screens 8 and 10*a*. By way of example, in this respect the machine keys are named for the functions "injection unit forward" or respectively "injection unit reverse", which are marked in FIGS. 2 and 3 with the reference numbers 14*a* and 14*b*. The above-mentioned movements of the injection unit can therefore be carried out with the same machine operating keys and with the same effect (namely the desired movement) both on the stationary operating device 6 and also on the mobile operating device 7.

Preferably, not only is an identical form or respectively identical design of the operating keys and other keys and/or displays provided, but preferably the entire operating—and display philosophy is to be the same on both operating devices.

Owing to the smaller dimensions of the mobile operating device 7 or respectively its touchscreen 9, provision is made according to the invention that predefinable regions of the touchscreen 8 of the stationary operating device 6 can be shown successively on the touchscreen 9 of the mobile operating device 6 or respectively on its touchscreen 9. A screen page of the large touchscreen 8 is divided as it were in terms of software into several smaller regions, which fit onto the smaller touchscreen and can be displayed there as separate screen pages. The production of the screen pages on the large touchscreen 8 and the production of the screen pages on the small touchscreen 9 takes place, however, independently of one another, as described above. In other words, this means that it only has the appearance is if individual regions of a screen page of the large touchscreen 8 were transferred from this successively to the mobile operating device 7 and shown there successively on the small touchscreen 9. However, this is not the case. Rather, the situation is that the regions to be displayed on the small touchscreen 9 are produced in the control component 30*a* of the linear robot itself and are displayed on the touchscreen 9. Provision made furthermore here that a shift key 15 is provided, by which a switchover can be carried out directly to the presentation according to the screen page 10*b*. Therefore, a changeover can be made on the mobile operating device 6 directly from the display of the region 8A to the machine operating keyboard according to the region 8D. A "return" key 16 can be provided as shift key on the screen page 10*b*, in order to arrive from the display according to 10*b* with the machine operating keys back to the display according to 10*a*. Instead of the use of shift keys 15 or respectively 16, the "switchover" between the screen pages 10*a* and 10*b* and vice versa can also take place by gesture, for example by sliding or swiping of the screen pages toward the left or right or upwards or downwards. In other words, the individual regions of the large touchscreen could also be shown successively by scrolling (in vertical or horizontal direction). Which regions of the large touchscreen 8 are or can be distributed onto which screen pages 10*a*, 10*b* etc. of the smaller touchscreen 7 and displayed successively depends ultimately on how the displaying of the screen pages is configured in terms of software. A variety of setting possibilities are conceivable here. As a result, the displayed regions can be presented on both touchscreens 8 and 9 therefore substantially in equal size.

Both on the large touchscreen 8 and also on the small touchscreen switchover elements 17*a*, 17*b* are presented and able to be selected, by means of which a switchover can be carried out directly back and forth between the "injection moulding machine" operating mode and the "handling device" operating mode. If, for example, the mobile operating device is being used by the operator with regard to the robot 5 in the "handling device" operating mode, in order to carry out adjustments on the robot, a switchover can be carried out directly to the "injection moulding machine" operating mode, if required, by means of the switchover element 17*b*, in order, for example, to carry out adjustments on the clamping unit 3. Following this, the operator can change back again and directly into the "handling device" operating mode. In each operating mode, respectively all available adjustment pages and operating keys can be selected. The production of these adjustment pages and operating keys (layout of the screen page) takes place for the stationary operating device 6 by means of the control component 30*b* associated with this operating device 6. On the other hand, the production of the adjustment pages and operating keys for the mobile operating device (i.e. layout of the screen pages) takes place by means of the control component 30*a* associated with this mobile operating device. In particular, all adjustment pages of the injection moulding machine and all machine operating keys of the injection moulding machine are available on the mobile operating device, or respectively can be produced and displayed there from the control component 30*a*, when the mobile operating device is in the "injection moulding machine" mode. Vice versa, all the adjustment pages of the linear robot and operating keys of the linear robot are available on the stationary operating device or respectively can be produced and displayed there from the control component 30*b*, when the stationary operating device is in the "handling device" operating mode. As a whole, therefore, a full integration of injection moulding machine and handling device is the result.

As the presentation of the screen pages on the stationary operating device and the presentation of the screen pages on the mobile operating device takes place independently of one another, the screen pages or respectively the layout could be very different on these operating devices, even if they are both in the same operating mode. To simplify the operating, the screen pages should, however, be as far as possible identical or very similar in their layout. For example, the regions from the large touchscreen which are to be displayed on the small touchscreen 9 should be largely identical in their presentation (layout, size) to the same regions, as are displayed on the large touchscreen. However, it would be conceivable for example to present the screen pages for the adjustment and/or operation of the linear robot on the mobile operating device 7 in a first colour (e.g. blue) and on the stationary operating device in a second colour (e.g. green).

The invention claimed is:

1. A device for operating an injection molding machine equipped with a handling device, said device comprising:
   a first stationary operating device secured to the machine and configured to operate both the machine and the handling device, said first stationary operating device having an input and an output, at least said output being constructed as a screen of a first greater size; and
   a second mobile operating device configured to operate both the machine and the handling device and having an input and an output, at least said output being constructed as a screen of a second size which is smaller than the first greater size,
   wherein predefinable regions of a screen page of the screen of the first greater size of the stationary operating device which occupy different parts of the screen of the stationary operating device are displayable successively on the screen of the second smaller size of the mobile operating device one region after another to be shown separately and individually on the screen of the second smaller size of the mobile operating device.

2. The device of claim 1, wherein the stationary operating device and the mobile operating device have each all operating keys necessary for operation of the machine and the handling device.

3. The device of claim 1, wherein the input and output are each configured as a touch-sensitive screen (touchscreen).

4. The device of claim 1, wherein the stationary operating device and the mobile operating device are each configured such that all screen pages relating to operation or control of the machine and the handling device are displayable.

5. The device of claim 2, wherein the operating keys or other input elements for the machine have a form which is identical on the stationary operating device and on the mobile operating device.

6. The device of claim 1, wherein the operating keys or other input elements for the handling device have a form which is identical on the stationary operating device and on the mobile operating device.

7. The device of claim 1, wherein at least one of the stationary operating device and the mobile operating device includes switchover elements which, when actuated, change a presentation on the screen and enable a change between a presentation of a display- and operating field of the machine and a presentation of a display- and operating field of the handling device.

8. The device of claim 7, wherein the screen of the mobile operating device is configured to allow a direct access to particular predefinable regions and to allow a changeover back and forth between a presentation of one of the regions of the screen of the stationary operating device and a presentation of another one of the regions of the screen of the stationary operating device.

9. The device of claim 8, further comprising direct switchover keys to effect the changeover back and forth between the presentation of the one of the regions of the screen of the stationary operating device and the presentation of the other one of the regions of the screen of the stationary operating device.

10. The device of claim 8, wherein the changeover back and forth between the presentation of the one of the regions of the screen of the stationary operating device and the presentation of the other one of the regions of the screen of the stationary operating device is effected by gesture.

11. The device of claim 1, wherein the mobile operating device has machine operating keys and input fields for input of parameters for operation of the machine.

12. The device of claim 1, further comprising a first control component operatively connected to the handling device, and a second control component operatively connected to the machine.

13. The device of claim 12, wherein the first control component is configured to produce screen pages on the mobile operating device, and the second control component is configured to produce screen pages on the stationary operating device.

14. The device of claim 12, wherein the first control component is configured to display data or graphic information relating to the handling device on screen pages of the mobile and stationary operating devices, and wherein the second control component is configured to display data or graphic information relating to the machine on screen pages of the mobile and stationary operating devices.

15. An injection moulding installation, comprising:
an injection moulding machine having actuators and sensors;
a handling device having actuators and sensors;
a device comprising a first stationary operating device secured to the injection moulding machine and configured to operate both the injection moulding machine and the handling device, said first stationary operating device having an input and an output, at least said output being constructed as a screen of a first greater size, and a second mobile operating device configured to operate both the injection moulding machine and the handling device and having an input and an output, at least said output being constructed as a screen of a second size which is smaller than the first greater size, wherein predefinable regions of a screen page of the screen of the first greater size of the stationary operating device which occupy different parts of the screen of the stationary operating device are displayable successively on the screen of the second smaller size of the mobile operating device separately one region after another to be shown separately and individually on the screen of the second smaller size of the mobile operating device, and
a central control connected to the stationary operating device and the mobile operating device via bidirectional data connections, respectively, and operatively connected with the actuators and sensors of the injection moulding machine and with the actuators and sensors of the handling device.

16. The injection moulding installation of claim 15, wherein the central control has a first control component which is operatively connected to the handling device, and a second control component which is operatively connected to the injection moulding machine, one of the bidirectional data connections connecting the first control component with the mobile operating device, and another one of the bidirectional data connections connecting the second control component with the stationary operating device.

17. The injection moulding installation of claim 16, wherein the first control component is connected with the actuators and sensors of the handling device via first data connections, and the second control component is connected with the actuators and sensors of the injection moulding machine via second data connections.

18. A method for operating an injection molding machine equipped with a handling device, comprising:
operating both the machine and the handling device by a first stationary operating device secured to the machine;
operating both the machine and the handling device by a second mobile operating device;
constructing at least an output of the stationary operating device as a screen of a first greater size;
constructing at least an output of the mobile operating device as a screen of a second size which is smaller than the first greater size; and
displaying predefinable regions of a screen page of the screen of the greater size of the stationary operating device which occupy different parts of the screen of the stationary operating device successively on the screen of the mobile operating device one region after another to be shown separately and individually on the screen of the second smaller size of the mobile operating device.

19. The method of claim 18, further comprising generating a layout of screen pages on the mobile operating device from a control component operatively connected to the handling device, and generating a layout of screen pages on the stationary operating device from a control component operatively connected to the machine.

20. The method of claim 19, wherein the first control component is configured to provide data or graphic information relating to the handling device and to transfer the data or graphic information to the mobile and stationary operating devices, and wherein the second control component is configured to provide data or graphic information relating to the handling device and to transfer the data or graphic information to the mobile and stationary operating devices.

* * * * *